(12) United States Patent
Deluga et al.

(10) Patent No.: US 7,888,540 B2
(45) Date of Patent: Feb. 15, 2011

(54) INTEGRATED SYSTEM AND METHOD FOR PRODUCING FUEL COMPOSITION FROM BIOMASS

(75) Inventors: Gregg Anthony Deluga, Playa del Rey, CA (US); Vladimir Zamansky, Oceanside, CA (US); Ke Liu, Rancho Santa Margarita, CA (US); Tiffany Elizabeth Pinard Westendorf, Troy, NY (US)

(73) Assignee: General Electric Company, Niskayuna, NY (US)

( * ) Notice: Subject to any disclaimer, the term of this patent is extended or adjusted under 35 U.S.C. 154(b) by 363 days.

(21) Appl. No.: 12/101,197

(22) Filed: Apr. 11, 2008

(65) Prior Publication Data

US 2009/0259082 A1  Oct. 15, 2009

(51) Int. Cl.
C10L 1/16 (2006.01)
C07C 1/00 (2006.01)

(52) U.S. Cl. .......... 585/14; 585/240; 585/253; 585/264; 585/733; 585/833; 48/127.9; 422/190

(58) Field of Classification Search .......... 585/14, 585/240, 242, 253, 264, 733, 833; 422/190; 48/127.9
See application file for complete search history.

(56) References Cited

U.S. PATENT DOCUMENTS

| | | | | |
|---|---|---|---|---|
| 4,364,745 A * | 12/1982 | Weil | ........ | 48/209 |
| 4,477,333 A * | 10/1984 | Hafez | ........ | 208/30 |
| 4,678,860 A * | 7/1987 | Kuester | ........ | 585/14 |
| 4,992,605 A | 2/1991 | Craig et al. | | |
| 5,186,722 A * | 2/1993 | Cantrell et al. | ........ | 44/605 |
| 5,710,030 A * | 1/1998 | Anderson | ........ | 435/134 |
| 6,409,912 B1 | 6/2002 | Wallace et al. | | |
| 7,232,935 B2 | 6/2007 | Jakkula et al. | | |
| 7,481,890 B2 * | 1/2009 | Cheryan | ........ | 127/39 |
| 7,507,869 B2 * | 3/2009 | Cisneros | ........ | 585/833 |
| 7,671,245 B2 * | 3/2010 | Ryder | ........ | 585/21 |
| 7,718,051 B2 * | 5/2010 | Ginosar et al. | ........ | 208/113 |
| 2005/0095183 A1 | 5/2005 | Rehmat et al. | | |
| 2007/0124992 A1 * | 6/2007 | Reaney et al. | ........ | 44/389 |

OTHER PUBLICATIONS

Douglas C. Elliott and Gary F. Schiefelbein; "Liquid Hydrocarbon Fuels From Biomass"; Amer. Chem. Soc., Div. Fuel Chem. Preprints 34(4) 1989, pp. 1160-1166.

(Continued)

*Primary Examiner*—N. Bhat
(74) *Attorney, Agent, or Firm*—Francis T. Coppa

(57) ABSTRACT

A method of producing a fuel composition from a bio-oil feedstock is provided, wherein the bio-oil feedstock is subjected to a step of oil extraction to produce a bio-oil and deoiled residue. At least a portion of the deoiled residue is gasified to produce a hydrogen-containing gas. The bio-oil is subjected to an upgrading process to ultimately produce a fuel composition. At least a part of the hydrogen-containing gas produced in the gasification of deoiled residue is used in the upgrading process of producing a fuel composition. The upgrading process, which can involve hydro-treating, hydroisomerization and at least one separation step, produces light hydrocarbons in addition to the product fuel composition. The light hydrocarbons can be used in the gasification operation, e.g., to reduce tar formation.

27 Claims, 7 Drawing Sheets

OTHER PUBLICATIONS

Tuula-Riitta Viljava; "From Biomass to Fuels: Hydrotreating of Oxygencontaining Feeds on a CoMo/Al2O3 Hydrodesulfurization Catalyst"; Industrial Chemistry Publication Series,No. 11, Espoo 2001, 50Pages; Retrieved from the Internet<URL: http://lib.tkk.fi/Diss/2001/isbn9512259125/isbn9512259125.pdf>.

World Jet Fuel Specifications with Avgas Supplement 2005 Edition; 51 Pages; Retrieved from Internet: URL<www.exxonmobil.com/AviationGlobal/Files/WorldJetFuelSpecifications2005.pdf>.

George W. Huber and Avelino Corma; "Synergies between Bio- and Oil Refineries for the Production of Fuels from Biomass"; Angew. Chem. Int. Ed. 2007, 46, 7184-7201.

* cited by examiner

INTEGRATED SYSTEM AND METHOD FOR PRODUCING FUEL COMPOSITION FROM BIOMASS

STATEMENT REGARDING FEDERALLY SPONSORED RESEARCH & DEVELOPMENT

This invention was made with Government support under grant number W911NF-07-C-0045, awarded by the US Army REDCOM. The Government has certain rights in this invention.

BACKGROUND

This invention generally relates to bio-fuels, and in particular to a system and method of deriving a fuel composition from biomass feedstocks in a integrated manner.

Increasing crude oil prices and increased environmental concerns have resulted in an increased interest in renewable energy sources. As is seen from the current direction of research, renewable resources like solar power and wind energy are used for production of electricity; whereas the fuels derived from biomass are predominantly used as transportation fuels.

In general, biomass such as wood and other plant biomass can be processed by two methods: biochemical methods such as fermentation; and thermochemical methods such as gasification. Biochemical methods use microorganisms to break down the biomass into simpler compounds such as ethanol. However these reactions are quite slow, and it can take at least several weeks to process a given batch. Due to factors like this, the biochemical processes, presently, are not in a state of direct industrial applicability.

Thermochemical methods involve processes such as biomass gasification, wherein the biomass is converted into syngas. The syngas is then transformed into various fuel compounds, using a variety of techniques such as Fischer Tropsch Techniques. These techniques are somewhat analogous to coal gasification, and the subsequent conversion to liquid fuels.

However, there are many differences between coal and biomass as a feedstock for gasification. As an example, due to the higher moisture content often present in biomass, a considerable amount of energy is required for drying the biomass. Biomass also has a larger amount of total volatile matter, as compared to coal. During gasification, the volatile matter is released at relatively lower temperatures.

A large part of this volatile matter is responsible for the tar formation during gasification of biomass. Tar levels in the product gas also depend on the gasifier configuration. In an updraft fixed bed gasifier that operates between about 300° C. and about 1000° C., the product gas contains up to 35000 ppm tar. In a downdraft configuration, the tar level in product gas is comparatively low, but still contains about 500 and about 1000 ppm tar. Depending on the gasifier configuration, tars tend to deposit on the walls of gasification equipment, or get transported downstream with the product gas. The tar deposits create the need for frequent maintenance, and may also reduce the operating life of the gasification equipment. The carryover of tar can deposit on and block filters, pipes, valves and turbochargers, leading to a decrease in performance. In some instances, elaborate cleaning systems are required to address these problems.

Other methods of using biomass sources to produce fuels involve producing oils from oilseeds and other feedstocks. These methods typically involve conversion to a diesel-like fuel, which is conventionally made by trans-esterification of oil derived from oilseeds, vegetable oils and animal fats. Trans-esterification involves a reaction with alcohol, and produces a mixture of esters of fatty acids. These fatty acid esters are typically called "biodiesel". Biodiesel is better suited for fuel applications than pure oils and fats, due to more advantageous characteristics; such as flow properties, combustion properties and the like. However, the use of the fatty acid ester fuels can result in operating problems—especially at low temperatures. Hence the use of bio-diesel in colder regions may be somewhat limited.

Frequently, these fatty esters need to be upgraded by hydro-processing, prior to use, so as to improve the operating temperature limits. The upgrading techniques primarily involve saturation of double bonds, which improves the minimum working temperatures of the biodiesel, and improves properties such as cloud point, cold filter plugging point, and pour point.

Other methods of producing diesel-like-fuel from vegetable oil sources involve directly hydro-treating of the bio-oils. This results in the breakdown of the triglycerides, which are primary constituents of the bio-oils. The reaction with hydrogen also results in saturation of double bonds, thus producing diesel fuel mixtures, which have better operating ranges.

Although such methods as these use renewable sources like bio-oils, the process itself is not completely renewable, due to the need for external hydrogen, which is required in these reactions. Hydrogen is typically derived from steam methane reforming, which depends on methane, and is not normally considered a renewable source. Alternate methods of hydrogen production include the use of water electrolysis. This method requires electricity as one of the major inputs. However, most electricity is currently produced from fossil sources such as coal, or natural gas. Thus even this method of hydrogen production is not completely renewable.

Moreover, biodiesel as a transportation fuel is not usable in all types of vehicles, since the properties of biodiesel are much different than gasoline. Biodiesel can be used in locomotives and some cars that are designed to operate with diesel fuel. Another large outlet for fuel is the aviation sector, where the fuel is, commonly known as "jet fuel". This sector also cannot readily use biodiesel.

With these considerations in mind, it is desirable to develop a method to produce fuel compositions such as jet fuel, from biological sources. It would also be very desirable to develop a solution to produce such fuel compositions from renewable sources, using a truly renewable process.

BRIEF DESCRIPTION OF THE INVENTION

Briefly, some embodiments of the present invention provide for a method of producing a fuel composition from a bio-oil feedstock, wherein the bio-oil feedstock is subjected to a step of oil extraction to produce a bio-oil and a substantially deoiled residue. At least a portion of the substantially deoiled residue is gasified to produce a hydrogen-containing gas. The bio-oil is subjected to an upgrading process to ultimately produce a fuel composition. At least a portion of the hydrogen-containing gas produced in the gasification of deoiled residue is used in the upgrading process of producing the fuel composition.

According to some embodiments of the present invention, a system for the production of jet fuel from a bio-oil feedstock is provided, wherein an oil extraction unit is configured to produce a bio-oil and a deoiled residue from the bio-oil feedstock. The system further includes an oil upgrading unit that uses hydrogen to convert the bio-oil to a jet fuel. The hydrogen required in the oil upgrading process is provided by gasification of a deoiled residue. In some embodiments, the hydrogen generated in the gasification operation is sufficient for bio-oil upgrading.

According to some other embodiments of the present invention, the integrated method of producing a fuel composition from a bio-oil feedstock involves an oil extraction step, an oil upgrading process, and a gasification operation. The oil extraction step produces a bio-oil and a deoiled residue from the bio-oil feedstock. The upgrading process for the bio-oil usually includes hydro-treating processes and hydro-isomerization operations arranged sequentially, and a separation unit. The separation unit-produces, the product fuel composition and light hydrocarbons. The gasification operation converts the deoiled residue to a hydrogen-containing gas. The hydrogen-containing gas is used in the oil upgrading process. The light hydrocarbons generated in the oil upgrading, process are used in the gasification operation, to reduce tar formation.

DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

As discussed in detail below, the embodiments of the present invention provide a renewable solution for production of fuel compositions from renewable feedstock, such as bio-oil feedstock. These embodiments also describe an improved process, with a well-coordinated integration of various units that, are involved. The embodiments of the present invention advantageously reduce the dependence on external reagents required in the process. The embodiments are also capable of producing chemicals in addition to the desired fuel compositions said chemicals being further usable the proposed renewable solution.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In some instances, the approximating language may correspond to the precision of an instrument for measuring the value.

Figure 1:
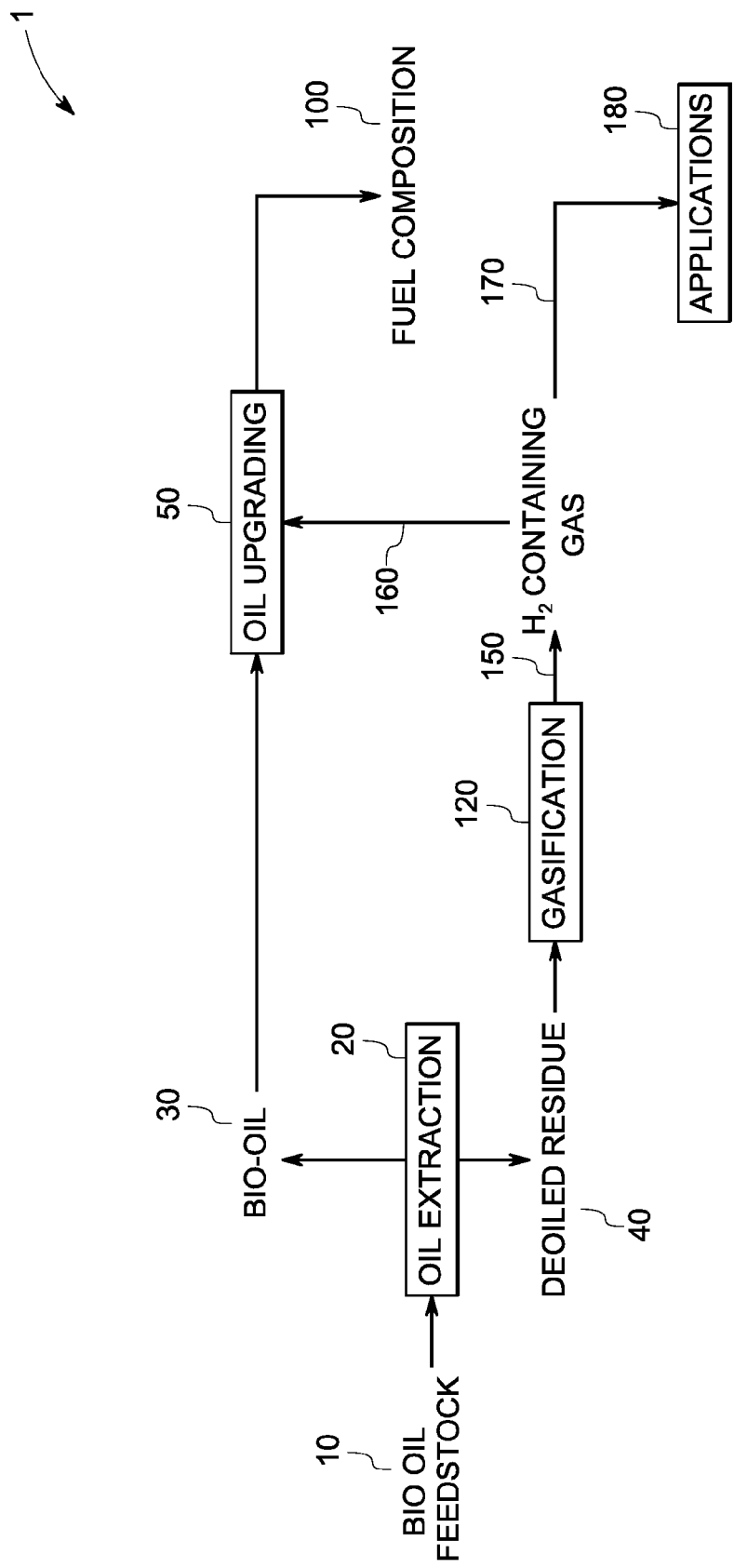
FIG. 1 is a schematic of one embodiment of the present invention.

The embodiments of the present invention, provide for a method and a system for producing a fuel composition, starting from a bio-oil feedstock. The process, according to one embodiment of the present invention, is shown in FIG. 1 generically as embodiment "1". A bio-oil feedstock 10 undergoes an oil extraction step 20 (discussed in more detail below), to produce a bio-oil 30 and a substantially deoiled residue 40. At least a portion of the deoiled residue 40 is subjected to a gasification operation 120, which produces a hydrogen-containing gas 150. At least a portion of the hydrogen-containing gas 150, labeled as 160, is sent to stage 50 wherein the bio-oil 30 is subjected to a process of oil upgrading, to produce a fuel composition 100. The remaining portion 170 of the hydrogen-containing gas 150 is used in various applications 180, such as power generation, heat generation, steam generation, mechanical power generation, and, chemical synthesis.

The starting material described in embodiments of the present invention is a, bio-oil feedstock 10. This feedstock includes materials that are used to produce oil, and which are derived from renewable sources such as plants and trees. These include oil bearing seeds like soybean, colza, camelina, canola, rapeseed, corn, cottonseed, sunflower, safflower, flax, olive, peanut, shea nut and the like. The bio-oil feedstock 10 may also include inedible varieties like linseed castor, jatropha and the like. Bio-oil feedstock 10 also includes other parts of trees that are used for oil extraction. Examples include coconut, babassu and palm in general, and in those instances the oil is typically extracted from kernels instead of the seeds. The bio-oil feedstock 10 may also include certain algae, microalgae and seaweeds that produce oil. Generically, feedstock 10 includes oils derived from plants and parts of plants, which may also be referred to as plant-oil or vegetable oil.

The terms "oil" or "oils" or "bio-oil" mentioned herewith refers to natural oil, which is already present in the feedstock, and typically produced by using mechanical and/or solvent extraction methods for the feedstock. The oils do not usually include pyrolysis oil, which is produced by thermochemical processing, such as pyrolysis of waste feedstocks.

Vegetable fats and oils are substances derived from plants that are composed of glycerol esters such as monoglycerides, diglycerides and triglycerides. As is known in the art, triglycerides are compounds wherein glycerol is esterified with three fatty acids. The chemical formula for triglycerides is as shown,

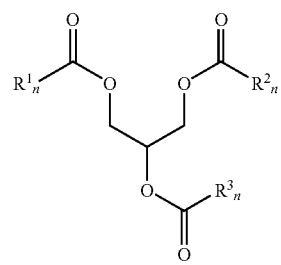

where $R_n^1$, $R_n^2$, and $R_n^3$ are long alkyl chains. The groups $R_n^1$, $R_n^2$, and $R_n^3$ may all be different, two of them may be same, or all three may be same. The subscript "n" usually has a value from about 1 to about 36. Thus the esters include long, carbon-containing alkyl chains. As an illustration, soybean comprises glycerides of palmitic acid, stearic acid and arachidic acids, while palm contains glycerides of palmitic and oleic acid, and the like. Typically, oils are liquid at room temperature, and fats are solid. A dense fat is also called a "wax". It is understood that the term "vegetable oil", or "bio-oil" used herein, also includes vegetable fats and waxes in addition to the vegetable oils. Thus, with reference to FIG. 1, bio-oil 30 usually includes the feedstocks containing vegetable fats and waxes. Generically, bio-oil 30 includes fatty acid compounds. In some embodiments, the bio-oil may include C16-C40 fatty acids. In some embodiments, the fatty acids may not necessarily be incorporated into the chemical structure of glycerides as described above, but can instead exist in other forms, e.g., as free fatty acids.

Generally, vegetable oils are extracted from plants by placing the relevant part of the plant under pressure, to extract the oil. Solvent extraction is another common method, which is used alone or in conjunction with pressure extraction. Typically, hexane is used as a solvent for oil extraction from oil seeds. Various other solvents with a boiling point less than the oil being extracted could be employed. Compounds with carbon numbers between $C_5$-$C_8$ are typically employed. In some embodiments a mixture of solvents may also be employed. In some embodiments, the solvent may include solvents such as naphtha. Often, a combination of mechanical extraction and solvent extraction methods is employed to extract oil from the oil seeds. Thus the step 20 (FIG. 1 and subsequent figures) of extracting oil from bio-oil feedstock 10 may include mechanical extraction, solvent extraction, or a combination thereof.

As an example, for an oilseed feedstock such as soybean, the oil extraction step 20 typically involves the following operations. The beans are first cleaned and dried. There may also be a temporary storage of the beans. The dry beans are then roasted to control the moisture contained in them. The beans are further cracked and de-hulled and conditioned with steam, for making flakes. The flakes are extracted with a solvent such as hexane, to remove oil. Residual hexane in the flakes is removed by steam treatment. The flakes and hulls together constitute deoiled residue 40 (FIG. 1). In some embodiments, the deoiled residue is subjected to de-gumming operations that remove phosphatides and gums, which can be refined into commercial lecithin. Lecithin may be further purified and sold as a food supplement, and for medical uses. In some embodiments, at least a portion of the deoiled residue could be sold as soybean meal. In some embodiments, the protein-rich component may be separated from the deoiled residue 40, using known methods, and sold as a variety of protein-type products.

The protein may then be used in food products such as beverage powders, salad dressings, soups, imitation meats, breakfast cereals, breads and the like. The protein compounds may also be used for non-food uses such as emulsification, texturizing, paper coatings, adhesives, paints, plastics, etc. The deoiled residue is extracted by water, a combination of water and alkali (with total pH in range about 7 to about 9), or aqueous solutions of sodium chloride—typically about 0.5 to about 2 M. The protein-rich component thus separated may be sold as a protein product as outlined above, or can be sent to the gasification operation 120.

The process 20 of oil extraction is similar to the process outlined above when the vegetable feedstock 10 involves oilseeds other than soybean. For other feedstocks such as coconut, additional operations like dehusking and splitting may be required. The pretreatment with steam for flaking may not be required for such feedstocks. Mechanical extraction may be employed as a first step for softer oil seeds and nuts, such as peanut and shea nuts. Mechanical presses may be employed in the process. Different solvents may be used for the extraction of oil from the bio-oil feedstock 10. The use of hexane is described above. In some other embodiments, solvents such as (but not limited to) benzene, cyclohexane, and various ethers may be used. In other embodiments, the extraction of oil may be carried out using supercritical carbon dioxide. Compounds other than carbon dioxide such as methane, ethane or propane (gaseous lower hydrocarbons in general) may also be used in the supercritical extraction of oil.

As described earlier, the vegetable feedstock 10 may also include algae. The algae are harvested by usual methods such as screening, using micro-screens, centrifugation, flocculation, etc. In some embodiments, the algae is dried (dewatered) and then subjected to oil extraction. In other embodiments, especially those where the water content is relatively low (e.g., when the algae has been separated using a high speed centrifuge), the harvested algae can be directly sent for oil extraction. The methods of extraction are similar to oil extraction from other bio-oil feedstock. For example, this may involve mechanical extraction, using different types of presses such as a screw press, piston press, expeller etc. Often, chemical methods are used for solvent extraction, with or without mechanical methods. This involves steps such as solvent extraction with hexane, supercritical $CO_2$, enzymes and the like. Other methods such as ultrasonication or osmotic shock may also be applied. In some cases, protein separation steps may also be included.

With all types of bio-oil feedstock 10, the extraction process ultimately results in a bio-oil 30 and a non-oil component, currently labeled as deoiled residue 40 in FIG. 1. It is noted that the stream 40, which is currently labeled as deoiled residue 40, may, contain traces of the bio-oil, depending on the efficiency of oil extraction. In some embodiments, the oil content in the deoiled residue may be up to about 5%. In some preferred embodiments, the oil content in the deoiled residue is less than about 0.5%. The terms "substantially deoiled residue", "deoiled residue" or "residue" used in this specification refer to the non-oil component as discussed above. The term "bio-oil" as used herein refers to the oils extracted from one or more of the various bio-oil feedstocks 10, described above. Traditionally, the deoiled residue is often used as animal feed. This invention provides for the advantageous use of this residue in the process of producing a fuel composition.

According to one embodiment of the present invention; at least a part of the deoiled residue 40 is subjected to gasification 120. This portion of deoiled residue may be a physical portion of the residue, or it may be components such as gum or phosphatides or phospholipids that are extracted therefrom, e.g., by the methods discussed above. In some embodiments, the entire deoiled residue is directed to the gasification operation 120. Gasification operation ("gasification island") 120 broadly involves thermal processing, of the feedstock.

Thermal processing involves processing of biomass feedstock by processes such as pyrolysis, partial oxidation, complete oxidation, or a combination of these processes. The term "pyrolysis" refers to the heating of feedstock in the absence of any oxygen. "Partial oxidation" refers to the heating of feedstock in the presence of sub-stoichiometric amounts of oxygen. "Complete Oxidation" refers to the heating of feedstock in the presence of stoichiometric or excess amounts of oxygen. Depending upon the configuration of the reactor in which the thermal processing is carried out, more than one of these reactions may be taking place in a single reactor. Hence, although the term gasification used herein refers predominantly to oxygen-starved reactions such as pyrolysis and partial oxidation, the conditions for complete oxidation may also be present in some parts of the gasification reactor (also called a "gasifier"). Gasification also involves reaction of the feedstock with steam.

The product gas from the gasification operation 120, also known as "synthesis gas" or "syngas", comprises carbon monoxide and hydrogen, which are formed in reactions like partial combustion, pyrolysis, and steam gasification. This is referred to as hydrogen-containing gas 150 in this description and figures. At least a portion, 160, of this hydrogen-containing gas 150 is used in the oil upgrading process 50. The remaining portion, 170, of the hydrogen-containing gas 150, may be used in various applications 180, such as but not limited to, power generation, heat generation, steam generation, mechanical power generation, and chemical synthesis.

The bio-oil 30 is subjected to oil upgrading process 50. The upgrading operation transforms the bio-oil 30 into a hydrocarbon fuel composition 100. The details of the upgrading process and the product composition are described below.

Figure 2:
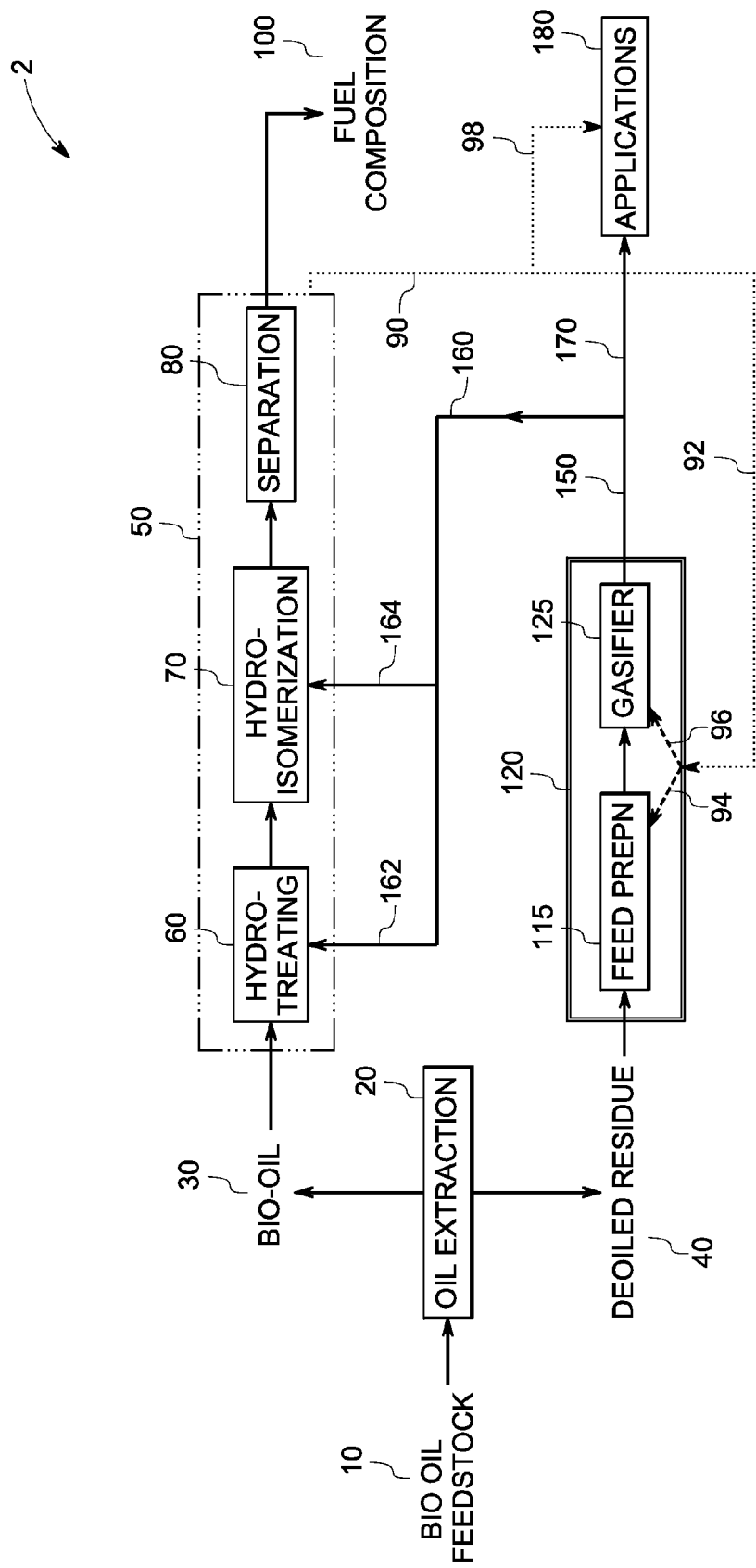
FIG. 2 shows a schematic of another embodiment of the present invention.

FIG. 2, referred to generally as embodiment "2", shows more details of the gasification operation 120, and bio-oil, upgrading process 50. The figure also shows another level of integration between the oil upgrading process 50 and gasification operation 120.

As shown in FIG. 2, the gasification operation 120 further involves a feed preparation step 115 and a gasifier apparatus 125. The deoiled residue 40 is subjected to feed preparation step 115, which includes one or more conventional unit operations such as sizing, moisture removal, volatile reduction, and carbonization. In other embodiments, the feed preparation step 115 involves slurrying of deoiled residue 40. After being treated in feed preparation step(s) 115, the deoiled residue 40 is directed to a gasifier 125. The gasifier 125 may be a fluidized bed gasifier, an entrained flow gasifier or any other suitable type of gasifier. Gasifiers are known in the art. A description of some of them (there are many other types as well) can be found in the "Kirk-Othmer Encyclopedia of Chemical Technology"—Fifth Edition, Volume 3, published in 2004, article "Biomass Energy", pages 693-699, which is incorporated herein by reference. For example, in an entrained flow gasifier, gasifying agents such as oxygen, air, steam, or combination of these, are used to fluidize the feedstock. The gas velocities are increased beyond minimum fluidization velocity, so that the materials are carried through the reactor. The gasifier converts the feed material into a hydrogen-containing gas 150. At least a portion of the hydrogen-containing gas 150, shown as 160, is used in the upgrading process 50, wherein bio-oil 30 is upgraded to fuel composition 100.

The upgrading process 50 involves operations like hydro-treating 60, hydro-isomerization 70 and a separation step 80. Hydro-treating is a unit process typically employed in the petrochemical industry for removal of sulfur, nitrogen and oxygen from oil fractions. It involves treatment of the feedstock with hydrogen, which reacts with these elements and forms hydrogen sulfide, ammonia and steam/water, which can be removed in subsequent operations. In the case of bio-oil processing as described in the embodiments of the present invention, hydro-treating is primarily employed to effect hydro-deoxygenation. Oxygen does not add to the heating value of the fuel product and hence, it is desirable to keep the concentration of oxygen at relatively low levels. In some embodiments, the oxygen concentration is reduced to levels as low as about 0.004% by weight. The hydro-treating reaction also involves saturation of the double bonds. It removes the double bonds from the components of bio-oil, and this reduces the problems associated with unsaturated compounds that would readily polymerize and cause fuel instability and problems in combustion.

It should be noted that the hydro-treating operation involved in refining petroleum crude is typically much different than the hydro-treating operation 60, used for bio-oil 30. The petroleum-based feedstock includes asphalt, aromatics, or ring compounds with chain lengths of about $C_{30}$. On other hand, bio-oil 30 includes compounds such as triglycerides, fatty acids and other esters of fatty acids. These compounds are quite different than the aromatic molecules involved in petroleum feedstock—primarily due to the oxygen content in the molecules of the feedstock. The hydrogen reacts with the triglycerides to form hydrogenated triglycerides. The hydrogenated triglycerides further react with hydrogen to form diglycerides, monoglycerides, acids, and waxes. These materials further react with hydrogen, to undergo hydro-deoxygenation to form linear alkanes. As shown below, some of the products include propane, as well as linear $C_{16}$ and $C_{18}$ alkanes. A side reaction—decarboxylation—can also occur, wherein $CO_2$ is removed as a byproduct, and normal alkanes with a lower carbon number are formed.

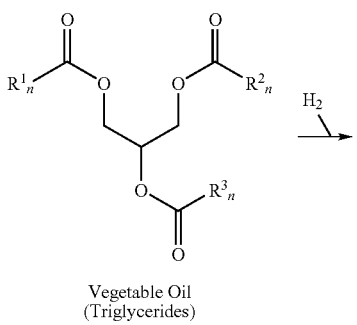

Vegetable Oil
(Triglycerides)

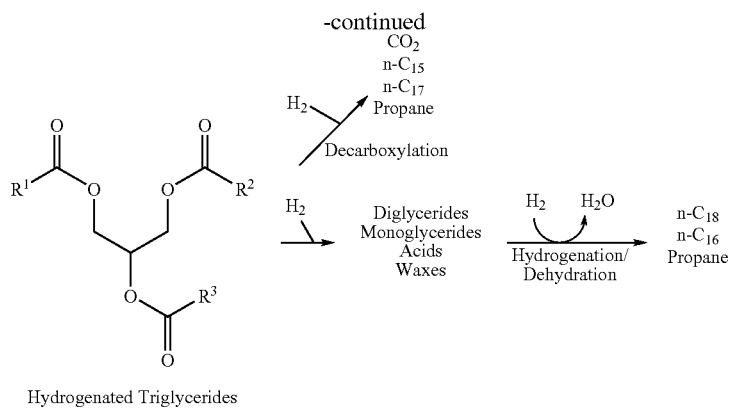

Hydrogenated Triglycerides

Here, $C_n$ refers to an alkyl group with a chain length of n units. Thus $C_{18}$ refers to an alkane with 18 carbon atoms in it. The prefix "n" is used to indicate that the hydrocarbon $C_{n+1}$ is formed with a "normal" or linear structure. The alkyl groups $C_n$ may be either saturated or unsaturated. The unsaturated hydrocarbons which are formed further react with hydrogen to form saturated hydrocarbons. The type of alkanes that are formed depends on the fatty acids and the glycerides present in the bio-oil 30 and in turn, on the composition of feedstock 10. The above illustration shows the typical reactions involved in the hydro-treatment of soybean oil. These reactions result the formation of compounds like n-$C_{18}$, n-$C_{16}$, and propane. Due to side reactions such as decarboxylation, compounds like n-$C_{15}$, n-$C_{17}$, and $CO_2$ can also be formed.

Transition metal sulfides are generally used as catalysts for hydro-treating-typically, sulfides of NiMo or CoMo may be used, as an example. Typical temperatures maintained during hydro-treating are between about 200° C. and about 450° C. A typical pressure range for the hydro-treating operation is between about 10 bar and about 80 bar. In some embodiments, the pressures of about 40 to about 60 bar and temperatures of about 280° C. to about 350° C. may be more preferred.

As shown in the reaction scheme above, hydro-treating step 60 results in the generation of water molecules, $CO_2$ and some light hydrocarbons such as propane, in addition to (long chain) linear alkanes, which are desired products. These are separated from the linear alkanes, before the step of hydro-isomerization (not shown in FIG. 2). In some embodiments (not shown), the water produced in the reaction is recovered and used to make steam, which is further used in the gasification reaction. In some embodiments, the propane produced is used as a fuel to generate heat energy. In some embodiments, the propane is used as a fuel in steam generating equipment, such as a boiler. The steam is then either delivered to the gasification operation 120, or used for some other purpose, e.g., separations such as steam stripping, steam lifting and the like. In some embodiments, the propane is burnt to generate heat that is used to sustain the hydro-treating 60 and hydro-isomerization 70 steps in the oil upgrading process 50.

In some embodiments, a pretreatment of the bio-oil 30, may be carried out prior to hydro-treating step 60. This pretreatment (not specifically shown here) may comprise steps such as demetallization and premixing with hydrogen.

Hydro-isomerization 70 typically involves reaction of the linear alkanes with hydrogen over catalysts, to produce branched compounds. Branched isomers of light paraffins have higher octane numbers than the corresponding normal straight alkanes and hence, are a desirable component of the fuel. For products such as jet fuel, the specifications require that the octane number for a lean mixture of the grade 80 fuel should be about 80 at minimum. For other grades, such as grade 100, the value is required to be about 91, and for grade 100 LL (Low Lead), the octane value needs to be at about 99.5 at a minimum. Other properties such as flash point, freezing point and the like are maintained in specified ranges for each variety. Manufacturers of jet fuel publish the specifications from time to time. Isomerization is also useful for improving the cloud point of the fuel, resulting in improved usability of the fuel at low temperatures.

Different catalysts are used in hydro-isomerization, depending, on the type of desired products. For example, the catalyst could be a noble metal catalyst such as platinum, a zeolite or a solid acid catalyst. Typical temperatures maintained during hydro-isomerization step 70 are between about 200° C. and about 450° C. A typical pressure range for the hydro-treating operation is between about 10 bar and about 80 bar. In some embodiments, a pressure range of about 40 to about 60 bar, and a temperature range of about 275° C. to about 350° C., may be more preferred. Typically the reaction involves rearrangement of the alkyl groups. In general terms, the hydro-isomerization may be represented as

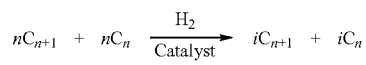

The prefix "i" represents the isomers with a branched molecular structure. Thus, compounds represented by formulae $iC_{n+1}$ and $iC_n$ represent isomers with different carbon chain lengths. The hydro-isomerization step 70 thus changes the carbon number distribution in the reactant compounds to the distribution in the product compounds. In some instances, hydro-isomerization step 70 may also include hydrocracking reactions. The hydro-isomerization usually results in the production of branched alkanes (paraffins and iso-paraffins) of various chain lengths, and cyclic compounds such as cycloalkanes. The composition of product compounds varies; depending upon the type of fatty acids involved in the glycerides or bio-oil feedstock 10; as well as process conditions. For a soybean seed feedstock, the hydro-isomerization step 70 can produce a mixture of about 5% LPG (butane), about 5% naphtha and gasoline, about 50% Jet Fuel range (as defined herein), and about 40% diesel fuel. However, the product composition varies widely, based on the operating conditions and specific catalysts used.

Separation step 80 separates various components of the isomerization products. This could involve, for example, a separation of different fractions (components or a set of components) based on their boiling point range. The separation step 80 can include any of the known separation techniques, such as flash distillation, fractionation, and the like. In one embodiment, the separation step involves a flash operation wherein the products of hydroisomerization operation 70, are sent at a high pressure to a flash vessel, and are subjected to a low pressure. Typically, two streams are formed—the gaseous stream rich in more volatile components and the liquid stream, which contains a higher percentage of lower volatile components. A cascade of such separations, or a distillation column, may be employed. The separation step 80 may also include a fractionation column, where multiple components (e.g., light hydrocarbons) can be separated in a single column. Some or all of these multiple light hydrocarbons may constitute stream 90, as shown in FIG. 2. The distillation and fractionation columns could be of any known type—a trayed column or a packed column, for example. These can be operated at various pressures that allow easy recovery of different components. In some embodiments, at least a part of the light hydrocarbon generated in hydro-treating operation 60 and/or the light hydrocarbon generated in hydro-isomerization operation 70 is sent to separation step 80. In some embodiments, both of these light hydrocarbon streams are directed to separation step 80.

The separation step 80 allows for greater control on the composition of the product fuel composition 100. In one embodiment, the separation step 80 is configured to produce a fuel composition rich in jet fuel components, described earlier. According to another embodiment, separation step 80 additionally separates light hydrocarbons such as propane. According to yet another embodiment, the separation step 80 is configured to separate solvents such as hexane.

In some embodiments, the fuel composition 100 includes a jet fuel. The jet fuel component is well known in the art, and is typically obtained between a boiling point range of about 160° C. and about 210° C. Also known as aviation turbine fuel, jet fuel is an aviation fuel with various specified grades such as Jet-A, Jet A1, JP-A, JP-B, JP4, JP-5, JP-7, JP-8, JP8+100 (characterized by more thermal stability than JP-8), and the like. Jet fuel is a special grade of kerosene; the specifications of various grades are specified by various standards. As an example, JP-8 is defined by standard—MIL-T-83133C. Various properties of jet fuel grades have strict ranges as defined by various standards. As an example, the freezing point for the Jet-A variety of fuel is about −40° C. For JP-5, it is about −46° C.; while for JP-8, it is −47° C., at a minimum. The flash point of JP-8 is about −38° C. at a minimum, while for some grades such as JP-5, it is about 60° C. The boiling point of the grades also varies, depending on the grades, e.g. from about 138° C. to about 205° C. As an example, the boiling point of grades such as Jet-A is about 150° C.-160° C. at a minimum, while for some grades such as JP-8, it is about 205° C. In some cases, the product composition is also known as "Synthetic Jet Fuel", to distinguish it from conventionally obtained jet fuel, obtained from petroleum sources. The properties of the synthetic jet fuel are substantially similar or identical to the properties of conventional jet fuel, and the fuel composition is referred to as "jet fuel" in this specification hereafter.

The fuel composition 100, prepared according to the embodiments of the present invention, ensures this characteristic, by way of hydro-isomerization reaction 70. This is a primary distinction from bio-diesel that is produced from vegetable oils, as described earlier. Different manufacturers and jet fuel users specify the jet fuel specifications. As an example, see World Jet Fuel Specifications 2005 Edition, published by ExxonMobil, available at www.exxonmobil-.com/AviationGlobal/Files/WorldJetFuelSpecifications2005.pdf. In some embodiments, various additives such as antioxidants (to prevent gumming), antistatic agents (to dissipate static electricity), corrosion inhibitors, icing inhibitors, etc., may be added to the fuel composition from oil upgrading process 50, before it is used as jet fuel. The amount and type of additives may be different for different grades of jet fuel.

The fuel composition can include fuel compositions different than jet fuel. In one embodiment, the fuel composition can be biodiesel. In other embodiments, the fuel composition includes synthetic fuels with compositions similar to conventional fuels. Non-limiting examples include gasoline and other fuels obtained by petroleum refining. In some embodiments, this includes fuels from distillate fuels, diesel fuel oil, light fuel oil and the like. The straight chain fuel compounds can be obtained by omitting the hydro-isomerization operation 70, described above.

As shown in FIG. 2, at least a portion 160 of the hydrogen-containing gas 150 emanating from gasification operation 120 is used in the oil upgrading section 50. The hydrogen-containing gas can be used in both hydro-treating step 60 and the hydroisomerizatiion step 70. This is shown by streams 162 and 164 respectively. In one embodiment, the hydrogen required for oil upgrading process 50 is obtained entirely from the gasification of deoiled residue 40. In another embodiment, a part of the hydrogen-containing gas, 170, is used in applications 180, in addition to being used for the upgrading process 50 of bio-oil 30. As shown in FIG. 2, the hydrogen-containing gas 150, emanating from the gasification island 120, can be split in two streams, 160 and 170. The hydrogen-containing stream 160 is directed to oil upgrading process 50.

With continued reference to FIG. 2, in some embodiments, the hydrogen requirement for both of the hydro-treating and hydro-isomerization operations is entirely met by the hydrogen-containing gas stream 160, that is in turn produced from the gasification of the deoiled residue 40. In such a case, stream 170 (use of hydrogen-containing gas in applications 180) may be optional. In other embodiments, it may be useful to provide additional quantities of hydrogen for hydro-treating step 60 and hydro-isomerization step 70, (and thus in the overall oil-upgrading process 50), i.e., amounts in addition to the hydrogen-containing gas 150, generated by the gasification island 120. At the startup of operation of the system, when an adequate quantity of hydrogen-containing gas 160 is not generated in the gasification operation 120, oil upgrading process 50, can be carried out from other sources of hydrogen if necessary.

In addition to the use of hydrogen-containing gas 150, the upgrading section 50 and the gasification operation 120 are further integrated as shown in FIG. 12. Accordingly, at least a portion of the light hydrocarbon 90 generated in the oil upgrading section 50 is used in gasification operation 120. The light hydrocarbon 90 may include at least a portion of propane or other lower hydrocarbons generated in the hydro-treating reactions described above, or it may include light hydrocarbons generated in the hydro-isomerization step 70. Light hydrocarbon 90 may also include a combination of byproduct hydrocarbons from those two sources. Hence, FIG. 2 (and subsequent figures described hereafter) shows that the light hydrocarbon 90 may originate from any of the individual steps within oil upgrading process 50.

In one embodiment, the term "light hydrocarbon", as discussed above, includes hydrocarbons with carbon numbers $C_1$ to $C_8$. In some embodiments, the light hydrocarbon stream 90 typically may comprise any hydrocarbons obtained in the oil upgrading reactions that have a boiling point up to about 160° C. In one embodiment, the light hydrocarbon stream includes lower boiling naphtha, and liquefied petroleum gas (LPG). The light hydrocarbon stream 90 can include compounds that may be either straight chain or branched. In another embodiment, the light hydrocarbon stream 90 comprises saturated compounds, such as cycloalkanes. Non-limiting examples of such compounds include cyclopentane, cyclohexane, or derivatives of these, e.g. methyl cyclopentane. In yet another embodiment, the light hydrocarbon stream 90 comprises aromatic compounds such as benzene, alkyl benzenes (e.g., toluene and xylene), naphthalene, and the like. The light hydrocarbon stream 90 may include one or more of the compounds described herein. The byproduct hydrocarbons generated in the oil-upgrading process may have a composition which can be broadly termed as light ends, middle range and relatively heavy end. Most of the middle range and heavy end materials constitute the fuel composition 100. The remaining portion of the hydrocarbons can be transported as stream 90. Thus, although referred to as "light hydrocarbon", the stream 90 may have some portion of heavy ends, as described above. A portion 92 of the light hydrocarbon stream 90 can be directed to gasification island 120. The remaining portion, 98 of stream 90, may be used in various applications 180 (described later), that broadly include end uses such as, the generation of heat energy or electrical energy, or chemical synthesis.

The light hydrocarbon stream 92 is used in the gasification operation 120 in a manner described in copending application filed on Dec. 21, 2007, with Ser. No. 11/962,245, incorporated by reference herein, in its entirety. The light hydrocarbon stream 92 could be used in multiple ways in the gasification 120 of the deoiled residue 40. In some embodiments, a portion of stream 92, labeled 94, is used to make a slurry of deoiled residue 40 in the feed preparation step 115 (shown as a dotted line to the feed preparation step). The slurry could be made directly, using only the light hydrocarbon 94, or a mixture of light hydrocarbon 94 and water. In other embodiments, the slurry could be made of water. In some instances, the deoiled residue 40 may be fed without any slurry into the gasifier.

With continued reference to FIG. 2, a portion of light hydrocarbon stream 92, labeled 96, can be sent directly to the gasifier 125. In some embodiments, both streams 94 and 96 can be provided, while in other embodiments, only one of the streams is used. In all of these embodiments, the presence and combustion of the light hydrocarbon compounds in the gasification reactor, either through direct injection, or with the slurry of deoiled residue, produces a high operating temperature in the gasifier. This results in an in-situ reduction of the tars, which are otherwise generated during gasification of biomass materials such as deoiled residue 40.

In another embodiment (not shown in the figures), the gasification of deoiled, residue 40 is carried out in a conventional manner, with a dry feed, and without the use of light hydrocarbon 94 or 96, as described above. The resultant tar-laden gas is subjected to a reforming step (not shown) to reduce the tars. The light hydrocarbon stream 92 is injected into the reformer, which is positioned downstream of the gasifier. The light hydrocarbon 92 can undergo complete or partial combustion in the reformer, resulting in higher temperatures in the reformer section. Higher temperatures in turn result in the cracking of tars. The higher the temperature in the reformer section, the greater degree of tar cracking, thus leading to greater tar reduction. Thus in this embodiment, tars which are formed in the gasifier are subjected to cracking in the reformer section, which is immediately downstream of the gasifier.

Embodiments described in the paragraphs above result in the formation of a hydrogen-containing gas 150, with less tar content. The reduction of tar levels reduces the problems (discussed in previous sections) related to the downstream use of the hydrogen-gas 150. In some embodiments, the use of light hydrocarbons in the gasification operation 120 results in the reduction of tar levels, up to about 80%. In some embodiments, the tar levels are reduced by at least about 90%. In other embodiments, the tar levels may be reduced to as low as about 1 ppm. As described earlier, the hydrogen-containing stream 150 is divided into portions 160 and 170. Stream 170 is used in applications 180, while stream 160 is sent to the oil upgrading process 50. In both of these end uses, the reduction of tar content ensures a more efficient operation.

During the process of reduction of tar in the gasification island 120 by any of the methods above, the light hydrocarbon itself undergoes cracking and partial oxidation. This results in the generation of lower hydrocarbons, CO, and hydrogen. Thus the use of light hydrocarbon stream 92 in the gasification island 120, not only reduces the tar levels but also generates more hydrogen, than that is generated by the gasification of the deoiled residue alone.

To summarize, as per the embodiment shown in FIG. 2, the bio-oil feedstock 10 is sent to an oil extraction step 20 to produce a bio-oil 30 and a deoiled residue 40. The deoiled residue 40 is subjected to a gasification operation 120 to produce a hydrogen-containing gas 150. A portion 160 of the hydrogen-containing gas 150 is used in the oil upgrading (step 50) of the vegetable oil. The remaining portion, 170, of the hydrogen-containing gas is used in various applications 180. The oil upgrading step 50 involves hydro-treating 60, hydro-isomerization 70, and separation 80, whereby, finally, a fuel composition 100 is produced. At least a portion of light hydrocarbon 90, produced in oil upgrading process 50, is directed to the gasification operation 120 (via stream 92), to reduce tar formation, and to improve the quality of hydrogen-containing gas 150, both in respect to lower tar levels and higher hydrogen (and thus energy) content. The remaining portion 98 may be used in various applications 180. (Those skilled in the art understand that other variations on the general scheme of this embodiment are also possible, and in line with this teaching).

Figure 3:
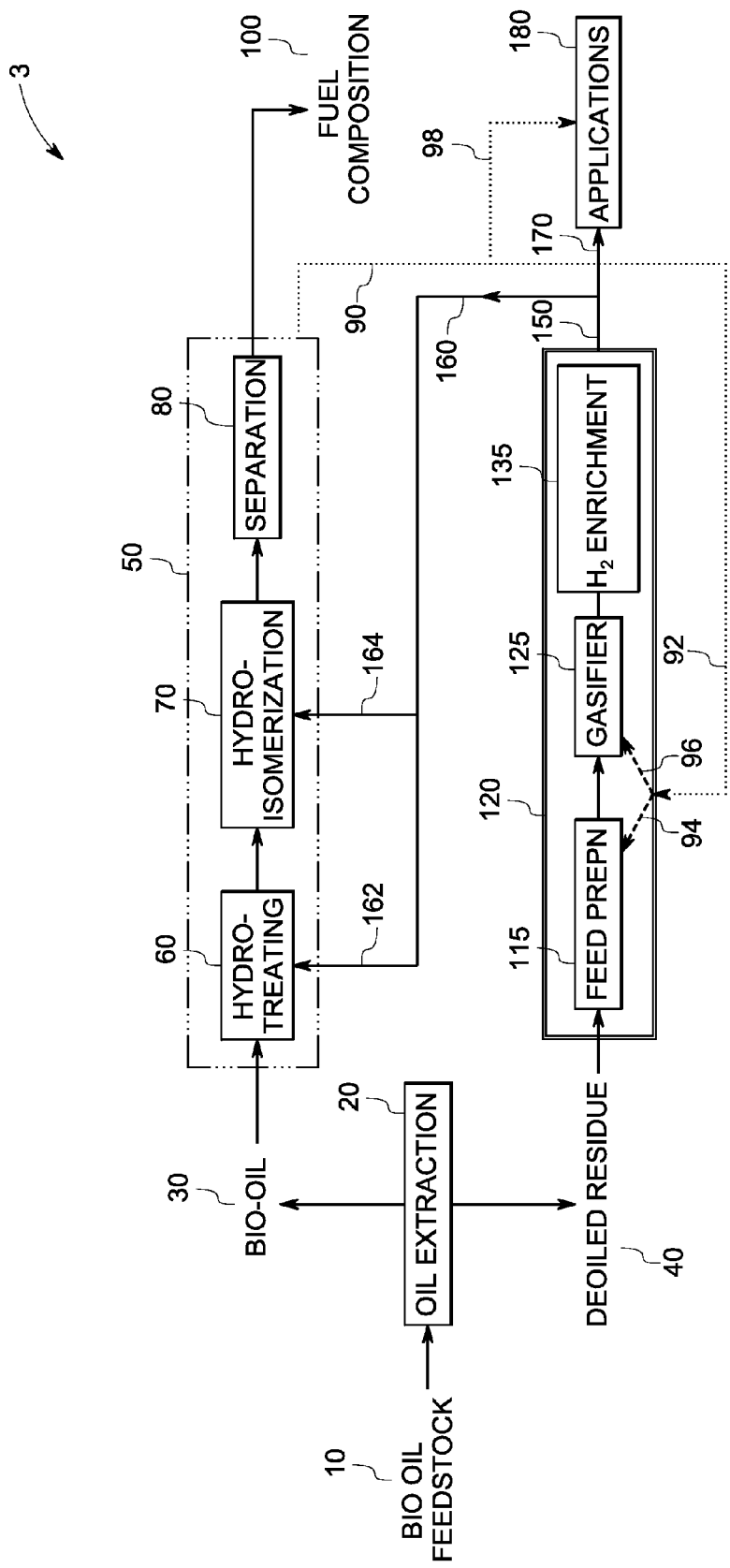
FIG. 3 depicts a schematic of another embodiment of the present invention.

Another embodiment is generically shown as embodiment "3" in FIG. 3. In addition to the presence of many of the features described above, the gasification operation 120 in this embodiment involves an additional step 135 of hydrogen enrichment. The product gas exiting gasifier 125, the syngas, is subjected to the hydrogen enrichment, wherein the hydrogen content of the syngas is increased. In one embodiment, the hydrogen enrichment is achieved by subjecting the syngas to, a water gas shift (WGS) reaction. WGS is known in the art, and involves reacting the hydrogen-containing gas with stream in the presence of catalysts such as metal oxides (e.g., iron oxide and copper oxide). In a WGS process, the water molecule reacts with carbon monoxide to form hydrogen and carbon dioxide.

$$CO + H_2O \rightarrow CO_2 + H_2$$

Thus, the WGS technique converts (removes) carbon monoxide from the syngas, and adds hydrogen to it, resulting in enrichment. The carbon dioxide from the enriched gas may be removed by known techniques such as absorption, adsorption, membrane separation and the like.

In other embodiments, the hydrogen enrichment process 135 includes a hydrogen selective membrane unit. The hydrogen is separated from the product gas coming out of the gasifier, resulting in a stream 150 that contains more than about 80% hydrogen by volume. In another embodiment, the enrichment process 135 includes a pressure swing adsorption unit to purify hydrogen. Other hydrogen selective membrane processes may also be used.

In another embodiment, the carbon monoxide content in the product stream coming out of the gasifier 125 is preferentially oxidized to carbon dioxide. The carbon dioxide is then subsequently removed by known methods such as absorption, adsorption, membranes and the like. In some embodiments, the membrane separation, absorption and the adsorption techniques mentioned above are configured to separate the non-hydrogen portion of the stream, such as carbon monoxide and carbon dioxide. The stream leaving such units is thus enriched in hydrogen by removal of non-hydrogen contents.

With continued reference to FIG. 3, the stream 150, which is enriched in hydrogen, is separated into portions 160 and 170. Stream 160 is used in the upgrading process 50 of bio-oil 30. As described previously, the upgrading process 50 further involves hydro-treating 60 and hydro-isomerization 70. As shown in FIG. 3, the stream 160 is divided into portions 162 and 164, which are directed to hydro-treating operation 60 and hydro-isomerization operation 70, respectively. In some embodiments, either one of the streams 162 and 164 may be present. In other embodiments, both streams 162 or 164 may be present. As described earlier, light hydrocarbon stream 90 is produced in various sections of oil upgrading process 50. Stream 90 may further be split into streams 92, and 98. Portion 92 is used in the gasification section 120, as described previously; and portion 98 is used in applications 180.

Figure 4:
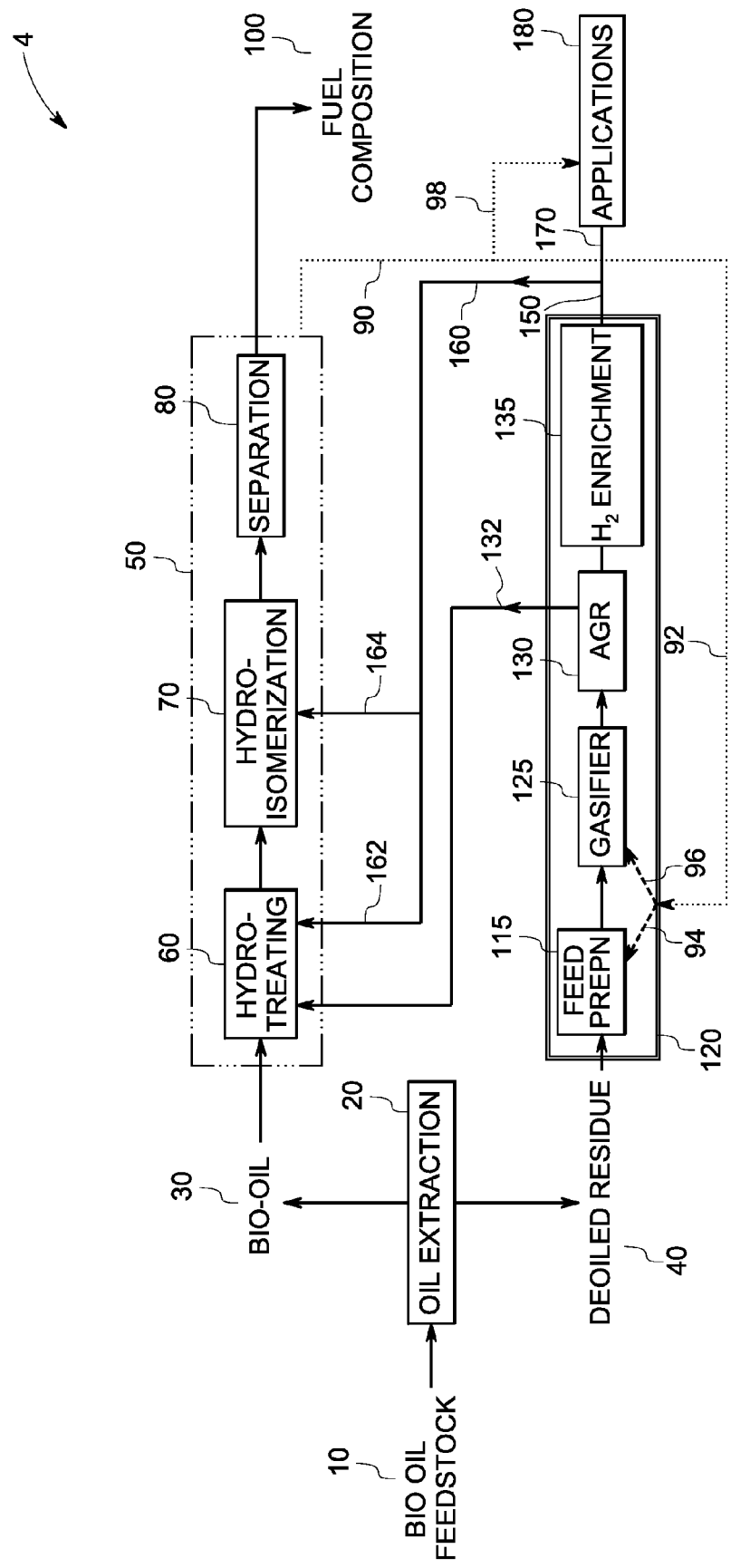
FIG. 4 is a schematic of another embodiment of the present invention.

FIG. 4 is a schematic of another exemplary system provided by the present invention, generically shown as embodiment "4". It shows additional details of the gasification island 120, and an additional level of integration within the gasification island 120 and the oil upgrading process 50. Specifically, the gasification island 120 depicts an acid gas removal (AGR) unit 130, in addition to the feed preparation step 115, gasifier 125, and a hydrogen enrichment step 135, discussed above. Acid gases such as $H_2S$, which is a predominant form of sulfur compounds present in the product gas from gasifier 125, are removed in the acid gas removal unit 130. The example described below describes removal of an acid gas such as $H_2S$. However, those skilled in the art may use known methods for removal of other acid gases. The amount of sulfur content depends on the type, of bio-oil feedstock 10. Depending on the feedstock 10, other compounds such as COS (carbonyl sulfide), $SO_2$, and the like, may also be present.

Typically, in an acid gas removal step, the product gas from gasifier 125 is passed over adsorbents like calcium oxide (dolomite), or other suitable sorbents that adsorb sulfur compounds. In some other embodiments, a fluidized or moving bed of adsorbents is employed. Other methods for removal of sulfur compounds and other gases, such as absorption in methanol-amine or other solvents, may also be employed. In another embodiment, the gas emanating from the gasifier 125 is passed over a catalyst under suitable conditions of temperature and pressure. This causes the sulfur components to react with a portion of hydrogen in the gas, to form $H_2S$. The $H_2S$ is then separated by suitable sorbents, or by passing through liquid compositions such as ethanolamines that adsorb the acid gases. The $H_2S$ may also be separated by using a membrane-based separation system.

The removal of $H_2S$ and other acid gases enables use of conventional catalysts in the WGS reactions in the hydrogen enrichment section. Use of exotic catalysts and materials of construction is avoided, thus leading to lower costs. The $H_2S$ thus removed in AGR section 130 is advantageously sent to the hydro-treating stage 60 of oil upgrading section 50. As described previously, typical hydro-treating catalysts comprise molybdenum supported on an alumina carrier, with either cobalt or nickel added as promoters for improving the catalytic activity. The sulfides of these compounds are more active forms that show higher activity. Supplying $H_2S$ to the catalysts helps in maintaining the sulfide levels in the catalysts, and thus maintains the activity of the catalysts employed. The $H_2S$ is directed from the acid gas removal, unit 130 to the hydrotreating section 60 as stream or pathway 132, as shown in. FIG. 4, for maintaining the sulfided state, and hence, the activity of the catalyst.

In some embodiments, a guard bed is provided (not shown) after hydro-treating section 60, to trap $H_2S$ and other sulfur compounds, and prevent them from going to hydro-isomerization section 70. Other conventional methods of removing sulfur compounds may also be employed. In some embodiments, stream 132, supplying $H_2S$ to hydro-treating section 60, may be optional, and this level of integration may be absent.

Figure 5:
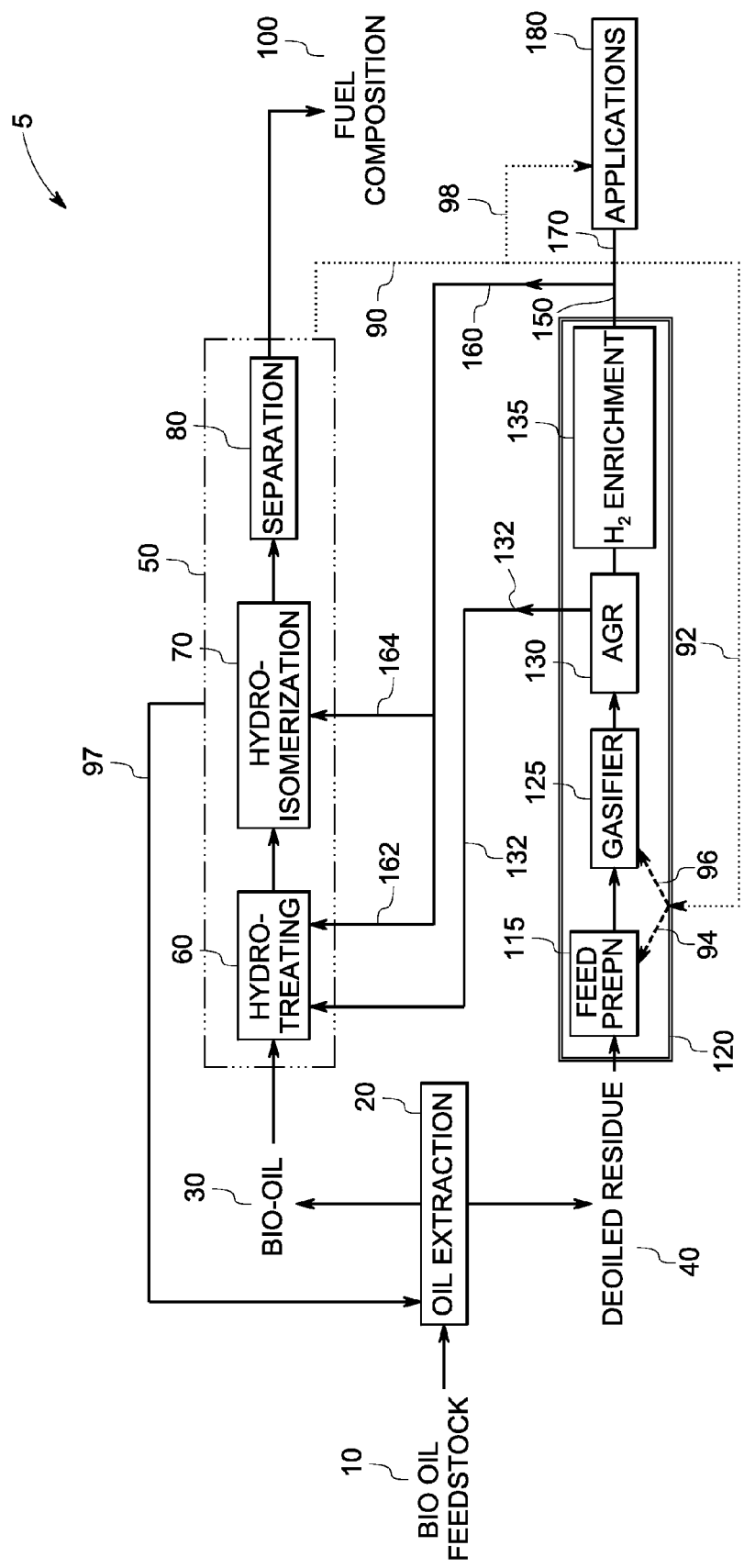
FIG. 5 depicts another embodiment of the present invention.

FIG. 5 shows another embodiment of the process of converting the vegetable oil feed stock 10 to a fuel composition 100. Shown generically as embodiment "5" in the schematic, the embodiments shows a further level of integration within the process. At least a portion 97 of the light hydrocarbon generated in oil upgrading process 50 is used in the oil extraction step 20. Advantageously, stream 97 comprises compounds such as n-hexane, which could be separated from separation step 80, following the hydro-isomerization step 70, or from separators (not shown), following hydro-treating step 60, or from a combination of these sources. Hence FIG. 5 shows the stream 97 coming out of oil upgrading process 50 generally. As described earlier, during the oil extraction process 20, solvents such as hexane are used to remove bio-oil 30 from the bio-oil feedstocks 10. Some embodiments of the present invention advantageously produce at least a part of the hexane used in the oil extraction. In another embodiment, substantially all of the hexane used for solvent extraction of the bio-oil feedstock 10 is provided by stream 94, thus further reducing dependence on external resources. In some embodiments, solvents other than n-hexane, outlined earlier, could be obtained from the oil upgrading unit 50, and used in the process of oil extraction. In some embodiments, the gaseous light hydrocarbons such as methane, ethane and propane could be converted to supercritical form (process step not shown) before being sent to solvent extraction. Other components of the schematic function in a manner similar to that described for FIG. 4.

Figure 6:
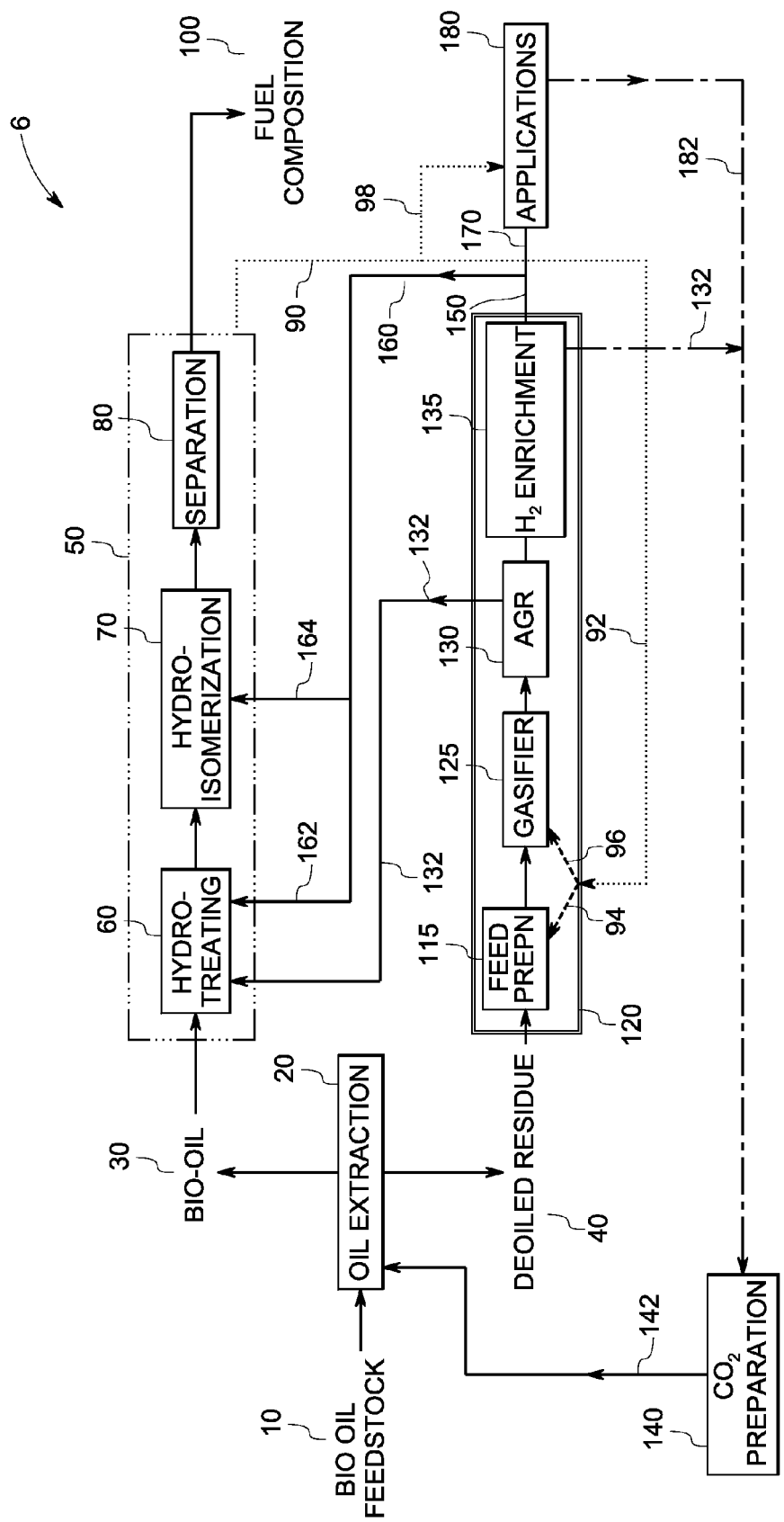
FIG. 6 represents another exemplary embodiment of the present invention.

FIG. 6 shows a schematic of the system as provided by another embodiment of the present invention, depicted generally as embodiment "6". As shown in the figure, carbon dioxide is extracted from the hydrogen enrichment step 135, shown as stream 138. As described earlier, the hydrogen enrichment step could involve WGS, followed by $CO_2$ removal, or it could involve a selective separation of non-hydrogen components. The $CO_2$ 138 can be taken up from any of these sources. A $CO_2$ stream 182 can also be extracted from various applications 180. The separated $CO_2$ may be purified and compressed to supercritical condition, in $CO_2$ preparation step 140. The supercritical $CO_2$ thus prepared is sent to the oil extraction step 20, to aid in separation of bio-oil 30 from the bio-oil feedstock 10, as described in previous sections.

The applications 180 mentioned in all of the Embodiments are now described. As briefly mentioned earlier, the applications 180 could include, at least one of power generation, heat generation, steam generation, mechanical power generation, and chemical synthesis. The applications use at least a portion of the hydrogen-containing gas 170, which is split from stream 150, produced in the gasification island 120. A portion of light hydrocarbon 98, which is split from light hydrocarbon stream 90, may also be used. Generically, the portion of light hydrocarbon 98 or the hydrogen-containing gas 170 will now be referred to as a "fuel gas". For some applications, such as chemical synthesis, the light hydrocarbon stream may be reformed to generate synthesis gas, with composition similar to the hydrogen containing gas 170. This is also designated as "fuel gas".

The fuel gas can be used for a number of purposes, e.g., for combustion in an internal combustion engine or a gas turbine, or for generating mechanical or electrical power. The resultant stream may also be fed to fuel cells for the generation of electrical power. Removal of $CO_2$ from fuel gas may be done to meet carbon emission constraints, or to earn carbon credits. The $CO_2$ removal may be effected by using any one of the techniques described earlier, such as absorption, adsorption or membrane separation.

The fuel gas can be burned (combusted) in a boiler to produce steam. The steam may be put to a variety of uses, such as a process stream e.g. in gasification, in heating purposes, to generate motive power, or to produce electrical power using steam turbines.

The fuel gas can also be used for synthesis of a fuel composition, similar to fuel composition 100, using Fischer Tropsch synthesis. When using the hydrogen-containing gas 150, the gas already has components such as carbon monoxide and hydrogen. When stream 90 is used, it involves light hydrocarbons. It is typically reformed to produce a fuel gas stream containing both carbon monoxide and hydrogen.

Typically, the chemical synthesis reactions, such as the Fischer Tropsch synthesis reaction, are used to form synthetic hydrocarbons from synthesis gas. As discussed earlier, for such reactions, the light hydrocarbon stream 98 may be reformed to produce a hydrogen containing gas or a fuel gas. These reactions require the "conditioning" of fuel gas, so as to maintain a desired-proportion of carbon monoxide and hydrogen. The appropriate ratio of these compounds can be achieved by selective removal of either of the compounds. For example, if the amount of carbon monoxide in the fuel gas is higher than the desired range, it may be selectively removed by membranes, or by preferential oxidation of CO. Alternatively, it may be subjected to the WGS reaction, which removes carbon monoxide from the fuel gas, and adds equivalent (molar) amounts of carbon dioxide and hydrogen to it. $CO_2$ is subsequently removed by suitable techniques, leaving the fuel gas with an altered proportion of carbon monoxide and hydrogen. Thus, by controlling the WGS reaction (e.g., its duration, conversion of CO, and the like), the proportion of carbon monoxide and hydrogen can also be controlled.

When the amount of hydrogen in the fuel gas is higher than the desired range, it may be removed by use of suitable separation techniques. It may also be removed by a reverse water gas shift reaction, wherein the carbon dioxide and hydrogen components are reacted in presence of a suitable catalyst to form carbon monoxide and water. This may typically be practiced when there is a substantial amount of carbon dioxide in the fuel gas, in addition to high levels of hydrogen. After the proper ratio of carbon-to-hydrogen has been achieved by these techniques, the fuel gas may be used in the synthesis of value-added chemical materials. Non-limiting examples of such materials include methanol, synthetic gasoline, diesel, jet fuel and the like.

Thus, the jet fuel and any other fuel composition 100 can be produced in two ways, using the system and method provided by the embodiments of the present invention. The first method involves the upgrading of the bio-oil 30, using oil upgrading process 50 as discussed previously. The second method involves the Fischer Tropsch synthesis, using the hydrogen-containing gas 170, and the light hydrocarbon 98.

In some embodiments, the fuel gas may be used for heating applications. As an example, the fuel gas may be used to fire a heater to produce thermal energy. In another embodiment, the fuel gas may be used in a boiler to produce steam. The steam may be further used for heating purposes, process applications, or in a steam turbine, to produce power.

In some embodiments, the fuel gas may be used in applications 180, at a desired location adjacent to the site of preparation. In other embodiments, the fuel gas can be transported to other sites (sometimes distant), for storage, further processing, or use in a selected application. Those skilled in the art are familiar with storage and transportation techniques for such materials.

EXAMPLES

The following examples are presented to further illustrate certain embodiments of the present invention. These examples should not be read to limit the invention in any way.

Figure 7:
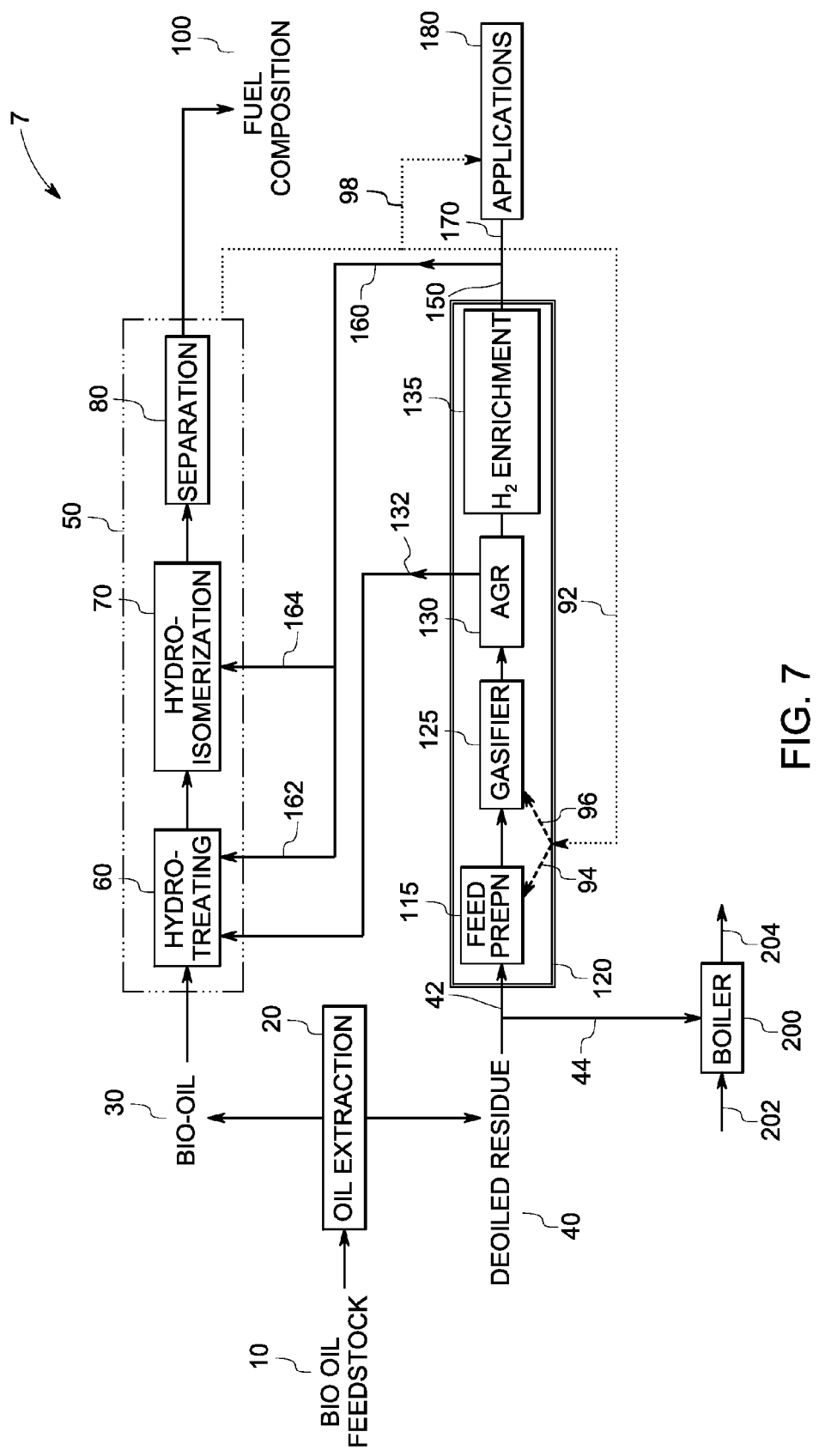
FIG. 7 shows a configuration of process for yet another embodiment of the present invention.

Simulations of the process illustrated in the embodiments of the present invention were carried out, using ASPEN® Plus. FIG. 7 shows a configuration "7", of the process provided by one embodiment of the current invention. A soybean material is used as the bio-oil feedstock 10. It is sent to the oil extraction step 20, wherein bio-oil 30 and a deoiled residue (non-oil component) 40 are produced in step 20. In this example, 8170 tons-per-day (tpd) of soybean are fed to the oil extraction step, to produce, 10000 barrels-per-day (bpd) of bio oil 30. The deoiled residue 40 is separated into components like lecithin, hulls and protein meals. In this case, the soybean is separated into 817 tpd of hulls, 5637 tpd meals, and 245 tpd of lecithin. 404 tpd of hulls are separated, and directed to a boiler 200 as stream 44. Boiler 200 uses water 202, to produce steam 204. Steam 204 could be used for heating, as a process stream (e.g. for gasification), or to produce electricity using steam turbines.

A portion of the deoiled residue 40 (stream 42) comprises lecithin (46 tpd), and is sent to the gasification island 120. Gasification of lecithin produces a hydrogen-containing gas 150. In this case, the stream 150 involves about 4.5% hydrogen by weight. This gas is used in the oil upgrading process 50, which in turn consists of hydro-treating 60, hydro-isomerization 70, and separation step 80. The hydro-isomerization step 70 produces a mixture of, by volume 5% LPG (butane), 20% naphtha and gasoline, 40% Jet Fuel range, and 35% diesel fuel. The separation step 80 separates jet fuel 100 and also generates light hydrocarbons 90. Thus in this case, the light hydrocarbon 90 includes butane, naptha and gasoline. Light hydrocarbon stream 90 is sent to gasification island 120, where it is used to reduce tar levels, as described earlier. According to this model, the process produces 6000 bpd of jet fuel (JP-8) in stream 100.

Thus, the embodiments of the present invention provide, for a method and a system for producing jet fuel and other fuel compositions, starting from bio-oil feedstock. The embodiments provide for an integrated process where the hydrogen required for the oil upgrading process is generated within the process, by gasification of deoiled residue. The embodiments of the present invention provide multiple levels of integration within the system and method. Accordingly, the light (lower) hydrocarbons generated during the oil upgrading process are advantageously used to reduce tar problems associated with the gasification of deoiled residue. Advantageously, the use of light hydrocarbons for tar reduction also increases the amount of hydrogen generated. In some embodiments, the hydrogen-containing gas is subjected to acid gas removal, such as desulfurization, which produces an $H_2S$-containing stream. The $H_2S$-containing stream is used in the hydro-treating process to maintain the activity of the catalyst. The light hydrocarbons (like propane) generated in the hydro-treating and hydro-isomerization processes can be combusted to produce utilities like steam and electricity. In one embodiment, the process is configured to produce hexane or other solvents in addition to the jet fuel. The hexane or solvent is then advantageously used in the oil extraction process. In some embodiments, the $CO_2$ is separated from the hydrogen-containing gas or applications 180, and is processed to produce a supercritical $CO_2$, which can be used in the oil extraction process. In some embodiments, at least a portion of light hydrocarbon 90 is used for reducing tar levels in the gasification island. A portion of light hydrocarbon 90 may also be used in the applications 180. In some embodiments, a part of the deoiled residue is directed to a boiler for producing steam for utility purposes. Thus the embodiments of the present invention describe a tightly integrated process and system to produce a fuel composition, with a reduced dependence on external reagents. The system also makes effective use of byproducts such as gum, which would otherwise be discarded.

Thus the embodiments of the process and the system described in this invention provide several advantages over other processes, and provide a unique solution to producing fuel compositions, starting from biomass sources such as bio-oil feedstocks.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for producing a fuel composition from a bio-oil feedstock, comprising the steps of:
    extracting a bio-oil from said bio-oil feedstock, producing a substantially deoiled residue as a byproduct;
    upgrading said bio-oil to produce said fuel composition; wherein the upgrading step comprises hydro-treatment of the bio-oil;
    gasifying at least a portion of said substantially deoiled residue to generate a hydrogen-containing gas; and
    supplying at least a portion of said hydrogen-containing gas in said upgrading of said bio-oil to produce said fuel composition.

2. The method of claim 1 further comprising a step of enriching said hydrogen-containing gas in hydrogen content.

3. The method of claim 2, wherein said step of enriching said hydrogen-containing gas is carried out by separating a hydrogen component with a membrane.

4. The method of claim 2, wherein said step of enriching said hydrogen-containing gas comprises preferential removal of non-hydrogen content.

5. The method of claim 2, wherein said step of enriching said hydrogen-containing gas comprises subjecting said hydrogen-containing gas to a water gas shift reaction.

6. The method of claim 1, further comprising a step of processing said hydrogen-containing gas in an acid gas removal unit, so as to produce hydrogen sulfide gas as a byproduct.

7. The method of claim 6, wherein at least a portion of the hydrogen sulfide gas produced in said acid gas removal unit is brought into contact with a hydro-treating catalyst which is present in the bio-oil upgrading step, so as to substantially maintain or increase the activity of the catalyst.

8. The method of claim 1, wherein the bio-oil comprises fatty acids.

9. The method of claim 1, wherein said step of upgrading said bio-oil comprises the sequential steps of hydro-treating, hydro-isomerization, and separation.

10. The method of claim 1, wherein said step of upgrading said bio-oil produces a light hydrocarbon byproduct.

11. The method of claim 10, wherein at least a portion of said light hydrocarbon byproduct is used in said step of gasifying said substantially deoiled residue to reduce tar formation.

12. The method of claim 10, wherein, at least a portion of said light hydrocarbon is used in said step of extracting oil from said bio-oil feedstock, as a solvent extraction medium.

13. The method of claim 1, further comprising separating carbon dioxide from said hydrogen-containing gas, and further using said separated carbon dioxide in said step of extracting oil from said bio-oil feedstock.

14. The method of claim 1, further comprising a step of directing said hydrogen-containing gas to a Fischer Tropsch synthesis reaction, to produce additional amounts of a fuel composition.

15. The method of claim 1, further comprising a step of preparing a slurry of said substantially deoiled residue with at least a portion of said light hydrocarbon, prior to the gasification step.

16. The method of claim 1, further comprising a step of reforming at least a portion of said fuel composition to generate a hydrogen-containing gas, wherein at least a portion of said hydrogen-containing gas is consumed in said step of upgrading said bio-oil.

17. The method of claim 1, wherein said bio-oil feedstock comprises at least one of palm, coconut, corn, cottonseed, algae and oilseeds.

18. The method of claim 17, wherein said oilseeds comprise at least one of soy, camelina, mustard, sunflower and jatropha.

19. The method of claim 1, wherein at least a portion of said hydrogen-containing gas is used in at least one application selected from the group consisting of electrical energy production, mechanical energy production, thermal energy production; and chemical synthesis.

20. The method of claim 19, wherein said electrical energy is produced by combusting said hydrogen-containing gas in at least one of a gas turbine, an internal combustion engine, and a fuel cell.

21. The method of claim 1, wherein at least a portion of said hydrogen-containing gas is used in a boiler to produce steam.

22. The method of claim 21, wherein said steam is further used in at least one application selected from the group consisting of (a) power production in a steam turbine; and (b) process steam applications.

23. The method of claim 19, wherein at least a portion of the energy produced in claim 21 is employed to carry out the step of upgrading said bio-oil.

24. An integrated method for processing a bio-oil feedstock, comprising:

(a) subjecting said bio-oil feedstock to an oil extraction process to produce a bio-oil and a substantially deoiled residue;

(b) gasifying at least a portion of said substantially deoiled residue to generate a hydrogen-containing gas;

(c) using said hydrogen-containing gas in upgrading said bio-oil by hydro-treating, hydro-isomerization, and separation steps, to produce a fuel composition and light hydrocarbons; and (d) directing at least a portion of said light hydrocarbons to gasification step (b), so as to reduce tar levels associated with gasification.

25. A system for producing a fuel composition from an oilseed feedstock, comprising:

an oil extraction unit to produce a bio-oil and a deoiled residue from said oilseed feedstock;

a bio-oil upgrading unit which requires hydrogen, to produce said fuel composition from said bio-oil;

a gasification unit to gasify at least a portion of the deoiled residue to produce a hydrogen-containing gas, in an amount sufficient for said bio-oil upgrading.

26. A method for producing jet fuel from a bio-oil feedstock, comprising the steps of:

extracting a bio-oil from said bio-oil feedstock, producing a substantially deoiled residue as a byproduct;

upgrading said bio-oil to produce said jet fuel;

gasifying at least a portion of said substantially deoiled residue to generate a hydrogen-containing gas; and supplying at least a portion of said hydrogen-containing gas in said upgrading of said bio-oil to produce said jet fuel.

27. The method of claim 26, where said jet fuel is selected from the group consisting of Jet-A, Jet A1, JP-A, JP-B, JP-4, JP-5, JP-7, JP-8, "JP8+100", and combinations thereof.

\* \* \* \* \*

UNITED STATES PATENT AND TRADEMARK OFFICE
CERTIFICATE OF CORRECTION

PATENT NO. : 7,888,540 B2
APPLICATION NO. : 12/101197
DATED : February 15, 2011
INVENTOR(S) : Deluga et al.

Page 1 of 2

It is certified that error appears in the above-identified patent and that said Letters Patent is hereby corrected as shown below:

In Column 1, Line 17, delete "a" and insert -- an --, therefor.

In Column 2, Line 6, delete "characteristics;" and insert -- characteristics, --, therefor.

In Column 3, Line 13, delete "unit-produces," and insert -- unit produces --, therefor.

In Column 3, Line 32, delete "of another" and insert -- of yet another --, therefor.

In Column 3, Line 54, delete "the" and insert -- in the --, therefor.

In Column 4, Line 22, delete "linseed" and insert -- linseed, --, therefor.

In Column 6, Line 39, delete "invention;" and insert -- invention, --, therefor.

In Column 7, Line 14, delete "bio-oil," and insert -- bio-oil --, therefor.

In Column 11, Line 43, delete "JP4," and insert -- JP-4, --, therefor.

In Column 12, Line 29, delete "hydroisomerizatiion" and insert -- hydroisomerization --, therefor.

In Column 12, Line 58, delete "FIG. 12." and insert -- FIG. 2. --, therefor.

In Column 14, Line 12, delete "hydrogen-gas" and insert -- hydrogen-containing gas --, therefor.

In Column 14, Line 60, delete "stream" and insert -- steam --, therefor.

In Column 16, Line 16, delete "removal," and insert -- removal --, therefor.

In Column 16, Line 18, delete "in." and insert -- in --, therefor.

Signed and Sealed this
Seventh Day of February, 2012

David J. Kappos
*Director of the United States Patent and Trademark Office*

CERTIFICATE OF CORRECTION (continued)
U.S. Pat. No. 7,888,540 B2

In Column 18, Line 40, delete "produce," and insert -- produce --, therefor.

In Column 20, Line 66, in Claim 23, delete "21" and insert -- 19 --, therefor.